United States Patent Office 3,002,862
Patented Oct. 3, 1961

3,002,862
INORGANIC COMPOSITIONS AND METHOD OF MAKING THE SAME
Robert Smith-Johannsen, Niskayuna, N.Y., assignor to Chemelex, Inc., Niskayuna, N.Y., a corporation of New York
No Drawing. Filed Aug. 24, 1955, Ser. No. 530,419
12 Claims. (Cl. 117—226)

This invention relates to new compositions of matter comprising clay particles coated with a tightly adhering layer of collapsed dense silica which are useful in the manufacture of electrically conductive compositions, films, and heating elements, and to the method of making the same. The invention also includes electrically conductive compositions, films, and heating elements made therewith, and the method of making the same.

According to this invention a finely divided silica is thoroughly mixed with a finely divided clay in an aqueous medium and heated to about the boiling point of the mixture for a sufficient length of time to cause a tightly adhering, collapsed dense coating or film of silica to form on the clay particles and to transform the original particles of silica, if in excess, to particles of increased size, of altered physical and chemical properties, and having a new and increased order of activity.

A colloidal silica such as that marketed under the trade name "Ludox" by E. I. du Pont de Nemours and Company can be used as a source of silica according to this invention. Ludox silica, as marketed, is a dialized alkali silica in the form of a water slurry containing about 30% solids and is composed of about 29 to 31% $SiO_2$, 0.29 to 0.39% $Na_2O$ and a maximum of 0.15% sulfates as $Na_2SO_4$. The silica particles of Ludox are very small ranging from about 0.01 to 0.03 microns in maximum dimensions. Ludox also has a silica-alkali ratio of from about 60:1 to about 130:1, a molecular weight, as determined by light scattering of more than one-half million, a relative viscosity at 10% $SiO_2$ of from 1.15 to 1.55 and may contain anywhere from about 20 to 35 percent by weight $SiO_2$. The method of producing and the properties of Ludox are described in U.S. Patent No. 2,574,902.

The amount of alkali present in the dispersed silica coated clay particles can be as low as that described above with respect to the specific Ludox silica and also as described in the United States Patent No. 2,574,902. The amount of alkali present in the dispersed silica coated clay particles will mainly depend upon the amount of alkali originally present in the silica dispersions, which is generally quite low. Additional alkali can be added if desired to as high as about 1 percent by weight expressed as $Na_2O$ based on the weight of the silica present.

China clay, or Georgia kaolin can be used as a clay in forming the new compositions of this invention. The amount of clay which can be added and heated with the silica can be varied within fairly wide limits depending upon the properties desired in the resulting composition or the subsequent use of it, such as in making electrically conductive compositions. The time of cooking of the silica and clay will also play a part in determining the amount of silica or clay. Compositions may be produced according to this invention in which no silica particles are present by maintaining the silica content low enough, or the clay content high enough, and cooking the suspension until all traces of $SiO_2$ not adhered to clay particles have disappeared. Similarly, compositions may be produced containing the large novel silica particles in addition to the coated clay particles by heating the clay and silica. As hereinbefore pointed out the large novel silica particles produced do not even resemble the silica particles originally used in the suspension before heating the mixture. Compositions can also be produced in which all of the silica is coated on the clay and containing in addition, clay particles.

The temperature used to cook the silica and clay particles can be varied depending upon the product desired and the amount of time that the suspension is heated. I have found that a temperature near the boiling point of the mixture is advantageous. When using a Ludox silica-china clay-water suspension the temperature can advantageously be about 85° C. At this temperature the clay particles become coated and the original silica particles transformed after about 8 to 12 hours heating time.

The compositions of this invention also exhibit a new and increased order of activity over compositions of silica, clay, or silica and clay heretofore known. The novel activity of the new compositions of this invention is apparent from the new chemical properties exhibited by them. For example when zinc dust is added to the compositions of this invention a solid gel is formed within two hours without any appreciable settling. When zinc dust is added to an uncooked silica-clay suspension, the zinc settles to the bottom, and this sediment gradually develops into a hard flaky material which cannot be redispersed. The completion of this change takes about 12 hours.

This invention also includes electrically conductive compositions, films, and heating elements made from the new compositions and methods of making the same. The electrically conductive compositions are made by incorporating graphite into the new compositions of this invention and applying the graphite containing suspension to a suitable insulating base and permitting the composition to dry and set. Upon removal of the dispersing medium by drying, the graphite particles are bonded together forming an electrically conductive composition which cannot be redispersed. The conductive compositions are porous and highly resistant to heat in that they withstand operating temperatures higher than was heretofore possible with graphite without burn-out or loss of adhesion and may be operated for extended periods of time without adverse effect on the conductivity or the physical properties of the compositions and films. The conductive compositions also are stable without any additional treatment at higher watt densities than was heretofore possible.

Acheson graphite has been found to be particularly advantageous as an electrically conductive material; however, other electrically conductive materials may be used with the new compositions of this invention. Some examples of suitable electrically conductive materials that may be used are colloidal or semi-colloidal graphite, finely divided graphite powder, graphite flakes, colloidal carbon, and the like. Combinations of electrically conductive materials may also be used.

The proportions of electrically conductive material or graphite which may be dispersed throughout the new compositions of this invention to form conductive compositions can vary within fairly wide limits. For example, when graphite is present in amounts of about 60 percent or less based on the total solid content in the mixture, good electrical conductivity and physical properties result. When the graphite percentage is reduced to about 25 percent and below, the conductivity of the composition falls off somewhat. It has been found that the most advantageous range of graphite is about 29 percent to about 51 percent. These limitations, however, are not to be considered critical, for the graphite concentration may fall outside these limits, dependent upon the degree of conductivity desired and the presence of other materials in the mixture in addition to the graphite and the silica coated clay particles. It is desirable to have and maintain a surface resistance of between 10 and 100 ohms per square inch in the films and the concentrations of the electrically conductive material can be sufficient to obtain a resistance within that range. The nature of the electrically conductive material chosen will also affect the electrical conductivity of the resulting films and also the proportions of electrically conductive material which will be necessary to achieve the desired electrical conductivity.

An advantage of the conductive compositions of this invention is that they can be impregnated with various resinous materials. The impregnation of the compositions or films increases the film strength and adds surface insulation to them without raising the resistance of the films to any significant extent, if at all. The conductive compositions when impregnated with solutions of natural or synthetic resinous materials will, of course, have an operating temperature limited to the operating temperature of the particular resin used to impregnate them. The impregnation of the compositions with various resinous materials in a sutable solvent does not affect the very strong and tough bond between the particles of electrically conductive material nor disrupt the electrical conducting paths established during the initial drying which constitute the electrical circuit. The bonds between the particles making up the compositions and with the insulating surface to which the compositions are attached are not infiltrated or weakened by the resin or solvent.

A wide variety of resinous materials may be used for impregnating the compositions. Various natural or synthetic resins commonly used in protective coatings or paints such as phenolic resins, alkyl resins, thermoplastic vinyl resins and the like may be utilized if desired. However, silicone resins have been found to be particularly advantageous. Silicone resins containing alkyl or aryl groups, or both, such as polymethylsiloxane, dimethylsiloxane, diethylsiloxane, methylethylsiloxane, phenylsiloxane, methylphenylsiloxane and the like are some examples. Blends of resins can also be used if desired. The choice of resin depends largely upon the desired flexibility of the film and the operating temperature desired.

The conductive compositions of this invention can be applied to, or impregnated into various electrical insulating surfaces intended as a support for the conductive compositions or films in any conventional manner such as by spraying, brushing and dipping. The thickness of the conductive composition when applied to a backing member may be varied as desired, however, I have found that a thickness of between about 2 to 10 mils is advantageous.

Some examples of insulating materials to which the conductive compositions of this invention can be advantageously applied are asbestos board, glass cloth, magnesium aluminum silicates such as cordierite, enamels, ceramics, quartz and the like. When using glass cloth as a backing surface it is advantageous to heat clean the glass cloth to remove the starch sizing.

This invention also includes conductive compositions produced in accordance with this invention adhered to glass cloth which exhibit improved physical, chemical, and electrical properties on glass or glass cloth. The compositions do not embrittle the glass or otherwise adversely affect it. Furthermore, the glass in no way adversely affects the conductive compositions. The compositions can also withstand high watt densities on glass (21 watts per square inch) while maintaining complete stability to resistance change than was heretofore possible. The compositions of this invention also exhibit improved properties when applied to a magnesium aluminum silicate such as cordierite than was heretofore possible. The percent increase in resistance is very small and they can easily be stabilized.

The following examples illustrate the method of making the new compositions of this invention and also the novel conductive compositions; it being understood that the invention is not limited thereto.

*Example 1.*—16 parts by weight of a water slurry of Ludox colloidal silica containing about 29 to 31% by weight of $SiO_2$ was thoroughly mixed with 3 parts by weight of china clay in a suitable container. The mixture was then heated at 85° C. for about 8 hours and allowed to cool. Electron microscope pictures showed that the china clay particles were coated with a tightly adhering, collapsed, dense film of silica. A film of chromium was evaporated on the particles of the heated composition and the absence of shadows in the electron microscope pictures clearly showed that the silica film or layer on the china clay particles was collapsed and tightly adhering.

In this example, the amount of silica present was in excess of the amount necessary to coat all of the clay particles at the time and temperature used and the resulting cooked composition also contained silica particles not adhered to the clay. The electron microscope pictures showed that these particles had a greatly increased average particle size over the particles of the original Ludox silica and the identifying characteristics of the Ludox silica had completely disappeared.

The composition of Example 1 thus comprised particles of china clay coated with a collapsed, dense, tightly adhering silica coating or film together with silica particles of greatly increased average size over those of the original silica particles used dispersed throughout water.

To the above composition produced in accordance with Example 1, a small amount of zinc dust was added. The presence of the zinc caused the composition to gel up to a solid state within 2 hours. When the same small amount of zinc dust was added to the original Ludox silica and also to a mixture of 16 parts by weight of the same Ludox silica and china clay which had not been cooked, the zinc settled to the bottom and gradually developed into a hard flaky material which could not be redispersed. This change was complete in 12 hours at room temperature. The compositions of this invention thus exhibit new chemical properties over Ludox silica alone or in an uncooked mixture of china clay and Ludox silica.

*Example 2.*—6 parts by weight of Acheson graphite was added to the cooked composition of Example 1 and the mixture sprayed on a piece of cordierite and air dried. Electrodes were painted on top of the coating at two outer edges thereof and mechanically connected to a source of potential. The film developed a resistance of 33 ohms per square inch and was stable after a few hours on-time at 31 watts per square inch. No other treatment was necessary to stabilize the conductive film. The dried film was also porous.

*Example 3.*—The dried porous film as produced in Example 2 was impregnated with a dimethylpolysiloxane resin. The impregnated composition took on the physical properties of the silicone resin and showed good flexibility and strength. The film also possessed the same electrical properties as the unimpregnated film of Example 2.

*Example 4.*—6 parts by weight of Acheson graphite was added to the cooked composition as produced in Example 1 and applied to a piece of heat cleaned glass cloth by spraying. Electrodes were applied on top of the conductive coating along two of the outer edges thereof and mechanically attached to a source of potential. 21 watts per square inch was then applied to the film. The film was completely stable and exhibited no change in resistance after a number of hours on-time. No stability treatment was necessary. The film did not adversely affect the glass cloth in any manner while in operation and did not embrittle the glass.

*Example 5.*—The porous dried film on glass of Example 4 was impregnated with a dimethylpolysiloxane resin and the resulting impregnated film exhibited the same electrical properties as the unimpregnated film in Example 4. In addition the film took on the physical properties of the silicone resin and exhibited good flexibility and strength.

I claim:
1. An electrically conductive composition consisting essentially of graphite dispersed throughout clay particles coated with a layer of collapsed dense silica, said graphite being present in said composition in a sufficient amount to render the composition electrically conductive.

2. An electrically conductive composition consisting essentially of graphite dispersed throughout china clay particles coated with a thin layer of collapsed dense silica and colloidal silica, said graphite being present in said composition in a sufficient amount to render the composition electrically conductive.

3. The process of making a new composition of matter which comprises heating a mixture consisting essentially of particles of china clay and silica dispersed throughout an alkaline aqueous medium for a sufficient length of time to form clay particles having a layer of collapsed dense silica adhered thereto.

4. The process of claim 3 in which the alkali content is about 1 percent by weight expressed as $Na_2O$ based on the weight of silica present.

5. An electrically conductive composition consisting essentially of a film of graphite dispersed throughout china clay particles coated with a layer of collapsed dense silica adhered to glass cloth, said graphite being present in said composition in a sufficient amount to render the composition electrically conductive.

6. An electrically conductive composition consisting essentially of a film of graphite dispersed throughout china clay particles coated with a layer of collapsed dense silica adhered to a magnesium aluminum silicate composition, said graphite being present in said composition in a sufficient amount to render the composition electrically conductive.

7. A new composition of matter consisting essentially of an alkaline water dispersion of particles of graphite, and particles of china clay coated with a layer of dense collapsed silica, said graphite being present in said composition in a sufficient amount to render the composition electrically conductive when dry.

8. The composition of claim 2 in which the alkali content is about 1 percent by weight expressed as $Na_2O$ based on the weight of silica present.

9. The process of making an electrically conductive composition, film, or heating element which comprises heating a mixture consisting essentially of a silica containing about 29 to 31 percent by weight $SiO_2$ and about 0.29 to 0.39% by weight $Na_2O$ and china clay in water at about 85° C. for a sufficient length of time to form a product having clay particles coated with a layer of collapsed dense silica, adding graphite to the resulting composition, and applying the composition to a suitable insulating base, said graphite being present in said composition in a sufficient amount to render the composition electrically conductive.

10. The process of claim 9, in which the insulating base is glass cloth.

11. The process of claim 10, in which the dried conductive film is impregnated with a silicone resin.

12. An electrically conductive article comprising a glass cloth base, a composition consisting essentially of graphite dispersed throughout china clay particles coated with a layer of collapsed dense silica adhered to said base, and said coating being impregnated with a silicone resin, said graphite being present in said composition in a sufficient amount to render the composition electrically conductive.

References Cited in the file of this patent

UNITED STATES PATENTS

| | | |
|---|---|---|
| 1,232,843 | Rice | July 10, 1917 |
| 2,187,622 | Koerner | Jan. 16, 1940 |
| 2,287,410 | Boller | June 23, 1942 |
| 2,361,220 | Loftis | Oct. 24, 1944 |
| 2,421,652 | Robinson | June 3, 1947 |
| 2,520,651 | Oswald | Aug. 29, 1950 |
| 2,522,750 | Deschamps | Sept. 19, 1950 |
| 2,551,864 | Zwelling | May 8, 1951 |
| 2,574,902 | Bechtold | Nov. 13, 1951 |
| 2,597,872 | Iler | May 27, 1952 |
| 2,660,537 | West et al. | Nov. 24, 1953 |
| 2,662,065 | Berry | Dec. 8, 1953 |
| 2,680,721 | Broge et al. | June 8, 1954 |
| 2,720,076 | Sachara | Oct. 11, 1955 |
| 2,731,371 | Ramadanoff | Jan. 17, 1956 |
| 2,791,515 | Nack | May 7, 1957 |
| 2,803,566 | Smith-Johannsen | Aug. 20, 1957 |